(12) United States Patent
Reid et al.

(10) Patent No.: US 6,605,557 B2
(45) Date of Patent: Aug. 12, 2003

(54) HALOGEN-RESISTANT MEDIA

(75) Inventors: John S. Reid, Wooster, OH (US); Thomas Szymanski, Hudson, OH (US); Karen C. Beal, Peninsula, OH (US)

(73) Assignee: Saint-Gobain Norpro Corporation, Stow, OH (US)

( * ) Notice: Subject to any disclaimer, the term of this patent is extended or adjusted under 35 U.S.C. 154(b) by 0 days.

(21) Appl. No.: 09/849,647

(22) Filed: May 4, 2001

(65) Prior Publication Data

US 2002/0165081 A1 Nov. 7, 2002

(51) Int. Cl.[7] .......................... C04B 33/04; C04B 35/03
(52) U.S. Cl. .................... 501/141; 501/118; 501/121; 501/122; 501/123; 501/127; 501/128
(58) Field of Search .................. 501/118, 119, 501/121, 122, 123, 127, 128, 141

(56) References Cited

U.S. PATENT DOCUMENTS

| | | | |
|---|---|---|---|
| 3,954,672 A | * 5/1976 | Somers et al. .......... 502/80 |
| 3,979,216 A | 9/1976 | Fritsch, Jr. et al. | |
| 4,235,855 A | * 11/1980 | Cleveland ............. 264/655 |
| 4,292,083 A | * 9/1981 | Rauch, Sr. ............. 501/104 |
| 4,632,876 A | 12/1986 | Laird et al. | |
| 4,869,944 A | * 9/1989 | Harada et al. .......... 138/111 |
| 4,950,628 A | * 8/1990 | Landon et al. .......... 501/118 |
| 5,296,423 A | * 3/1994 | Locker ................. 264/176.1 |
| 5,409,870 A | * 4/1995 | Locker et al. .......... 264/631 |
| 5,429,779 A | * 7/1995 | Locker et al. .......... 264/40.1 |
| 5,731,250 A | 3/1998 | Reid et al. | |
| 5,773,103 A | 6/1998 | Ciora, Jr. et al. | |
| 6,207,612 B1 | 3/2001 | Reid et al. | |
| 6,300,266 B1 | * 10/2001 | Beall et al. ........... 264/177.12 |

FOREIGN PATENT DOCUMENTS

RU   2101259 C   1/1998

\* cited by examiner

*Primary Examiner*—Michael Marcheschi
(74) *Attorney, Agent, or Firm*—Fay, Sharpe, Fagan, Minnich, & McKee, LLP

(57) ABSTRACT

Ceramic mass transfer media suitable for use in thermal regenerative oxidizers made using a mixture of a clay, talc and optionally a dolomitic limestone have enhanced resistance to environments containing halogens and hydrogen halides.

11 Claims, 4 Drawing Sheets

HALOGEN-RESISTANT MEDIA

BACKGROUND OF THE INVENTION

The present invention relates to ceramic media, such as used in mass transfer applications and particularly to applications involving exposure to operating conditions containing halogens or halogen halides. Mass transfer, in the context of this Application, can mean separation of a component from a mixture of liquids or gases or the extraction of heat from a fluid flow. The ceramic media can be in the form of packing elements, such as those shapes commonly used in mass transfer applications, or other random or structured packing element shapes. The ceramic media could alternatively be in the form of bed support media. Without prejudice to the generality of their application in such fields, the ceramic media of the invention are particularly useful in the context of regenerative thermal oxidizers ("RTO's") in which a gas flow containing halogens, (typically chlorine, but with some bromine and/or fluorine components possible), and the correlative hydrogen halides.

RTO units are becoming more important as the drive to clean up effluent gases and to-conserve energy becomes more urgent. In an RTO unit an effluent gas containing combustible or pyrolyzable materials is cycled through a first chamber containing packing elements that has previously been heated and thereafter enters a combustion chamber where the combustible or pyrolyzable materials are burned. The effluent gases then pass through a second chamber containing packing elements. These absorb at least some of the heat from the gases before the effluent is discharged to the atmosphere of for further processing. When the elements have reached an elevated temperature such that heat transfer no longer occurs efficiently, the flow direction is reversed and the second chamber becomes the first chamber and vice versa.

The packing elements in the chambers of the RTO can be in the form of monoliths with a plurality of through passages that are stacked within the chamber to provide a plurality of rectilinear parallel passages through which the gas can flow on its way through the chamber. Alternatively and often preferably the elements are relatively small individually and are dumped in random fashion within the chamber so as to provide a large number of non-rectilinear routes through the chamber for the gas. The individual elements can have a wide range of shapes such as hollow cylinders, with and without internal septa or other internal structures, cylinders with triangular or "bow-tie" crosssections, and porous pellets.

Gas flows that are particularly suitable for treatment using RTO's may be generated for example when gas flows containing combustible materials that include halohydrocarbons are burned in an RTO unit as part of an effluent purification process. In such applications it is necessary that the elements used in the RTO are capable of absorbing heat rapidly and are stable under thermal cycling conditions as would be expected, but also that they are resistant to attack by the halogen-containing components of the effluent. This is important since replacement of the packing elements usually requires a shutdown of the RTO while the elements cool, are then extracted and replaced. Obviously the fewer times this has to occur, the better and more economically the unit operates. Furthermore, in the cases in which the ceramic elements in the RTO's are attacked by the halogen-containing components of the effluent, but not so severely as to degrade the media to the point of necessitating a change-out, there are still problems that result directly from the ceramic-halogen reactions. The reaction of the halogens, such as Cl2 and other chlorine-containing gases with the elements inherently present in ceramic media, especially Na, K, and possibly Li, Ti and Fe, results in the formation of a precipitate, particularly NaCl and KCl, downstream from the thermal oxidizer. In the cases with downstream waste-heat boilers, this deposition of the precipitate causes a buildup and eventually fouling of the boiler, which causes a shutdown of the whole process for a clean-out.

Typical packing elements for RTO applications are made from clay/feldspathic material mixtures because these have good stability to thermal cycling while having a good capacity to absorb heat. They are, however, seriously attacked by atmospheres containing halogens or halogen acids. The present invention provides packing elements that are relatively stable to attack under such conditions and which therefore provide a significant advantage for treatment of hot halogen or hydrogen halide-containg effluents from catalytic or other processes for making or treating halogen-containing organic compounds.

DESCRIPTION OF THE INVENTION

The present invention provides a ceramic packing element having an alkali metal content that is not greater than 0.25% by weight, formed from a fired mixture comprising 10 to 98%, and preferably from 35 to 65%, by weight of a clay having an alumina content of at least 36% by weight; from 2 to 90%, and preferably from 35 to 80%, by weight of a talc containing at least 95% by weight of magnesium silicate as determined by X-ray diffraction analysis; and from 0 to 10%, preferably from 3 to 7%, of a dolomitic limestone containing at least 60 to 90% by weight of calcium carbonate and at least 10% and preferably 40 to 10%, by weight of magnesium carbonate and less than 10% of non-carbonate impurities.

The clay component is one that has an alumina content as received of at least 36%, which after calcination would be at least 42% by weight largely as result of the loss of free and bound water. The other major component, (at least 50% by weight), is silica but minor amounts of the oxides of calcium, magnesium, sodium, potassium, iron and titanium can also be present, usually in amounts of less than 1% each and, with respect to alkali metals, an amount that is rot greater in total than would lead to ceramic media with 0.25% or more of alkali metal oxides. The alkali and alkaline earth metal oxides are preferably present in amounts less than 0.2% by weight. A typical clay component suitable for use in this invention is a ball clay.

Before firing to produce the ceramic, the clay is preferably processed to a fine powder with at least 95% of the powder weight having particle sizes less than 10 micrometers and more preferably with at least 50% by weight having particle sizes less than 1 micron. The methylene blue index, ("MBI"), of the preferred clay, as measured according to the procedure in ASTM C-837, is at least 7.5 meq./100 gm, indicating reasonably good forming and shaping capability as compared to other clays containing at least 42% aluminum oxide after calcination.

Chemical analysis of preferred talcs for use in the ceramic elements according to the invention shows at least 60% by weight of silica, preferably from 60 to 66% by weight, and at least 30%, preferably from 30–33%, by weight of magnesium oxide, measured by X-ray fluorescence. Alkali metal oxides preferably account for less than 0.1% by weight of the talc. The loss-on-ignition of the talc, largely as a result of elimination of free or chemically bound water, is typically less than about 9%, such as from 1 to 9%, by weight with the preferred talcs. The talcs preferred for use in the ceramics according to the invention have a particles with sizes such that at least 95% by weight are 200 mesh, (74 micrometers), or finer.

The dolomitic limestone, which term is intended to convey a mixed carbonate of magnesium and calcium in a weight ratio of these carbonates of from 1:5 to 1:7, may be present in amounts of up to 10% by weight, for example from 2 to 8% by weight. It is preferred that the iron oxide content of the limestone be less than 1% by weight and that of the alkali metal oxides be less than 0.5% by weight. It is preferred that the limestone be processed prior to formation of the ceramic to a powder with particles sizes in which at least 95% by weight, and more preferably at least 99% by weight, are 325 mesh, (44 micrometers), or smaller.

To make the ceramic packing elements according to the invention the components are measured out by weight and thoroughly mixed before water is added in an amount that is sufficient to enable the mixture to be shaped into the desired form and to retain that form during firing. Generally this implies that the amount of water added should be from 12 to 30 ml for every 100 gm of the dry mixture of the components. It is also possible, though generally unnecessary, to add extrusion aids or other flow agents to make the subsequent shaping process easier and to confer some added green strength to minimize slumping during firing.

The shapeable mixture can then be molded, or preferably extruded to form the desired shape before the shape is fired in a kiln to a maximum temperature of from 1100° C. to 1400° C. The temperature in the kiln usually increases at a rate of between 50 to 90° C./hr. and the dwell time at the calcining temperature is usually from 1 to 4 hrs before the kiln is allowed to cool to ambient temperatures.

DESCRIPTION OF PREFERRED EMBODIMENTS

The invention is now further described with reference to the following Examples, which show the advantages conferred by the present invention in terms of resistance to halogen-containing atmospheres.

Evaluation Procedure

To establish a suitable test for the ceramic materials of the invention, a typical industrial process was identified and a test-bed apparatus was set up to replicate the essential exposure conditions experienced by ceramics in an RTO used in conjunction with that process. In this commercial process the gases passing into a RTO were at a temperature of 1038° C. and contained hydrogen chloride and chlorine gases along with other chlorine-containing compounds and oxygen. The partial pressure of chlorine was from $8 \times 10^{-7}$ to $1 \times 10^{-6}$ atmospheres and that of oxygen was $3 \times 10^{-3}$ to $6 \times 10^{-2}$ atmospheres and such concentrations are typical of industrial processes where ceramic elements would be subject to halogen attack.

Figure 1:
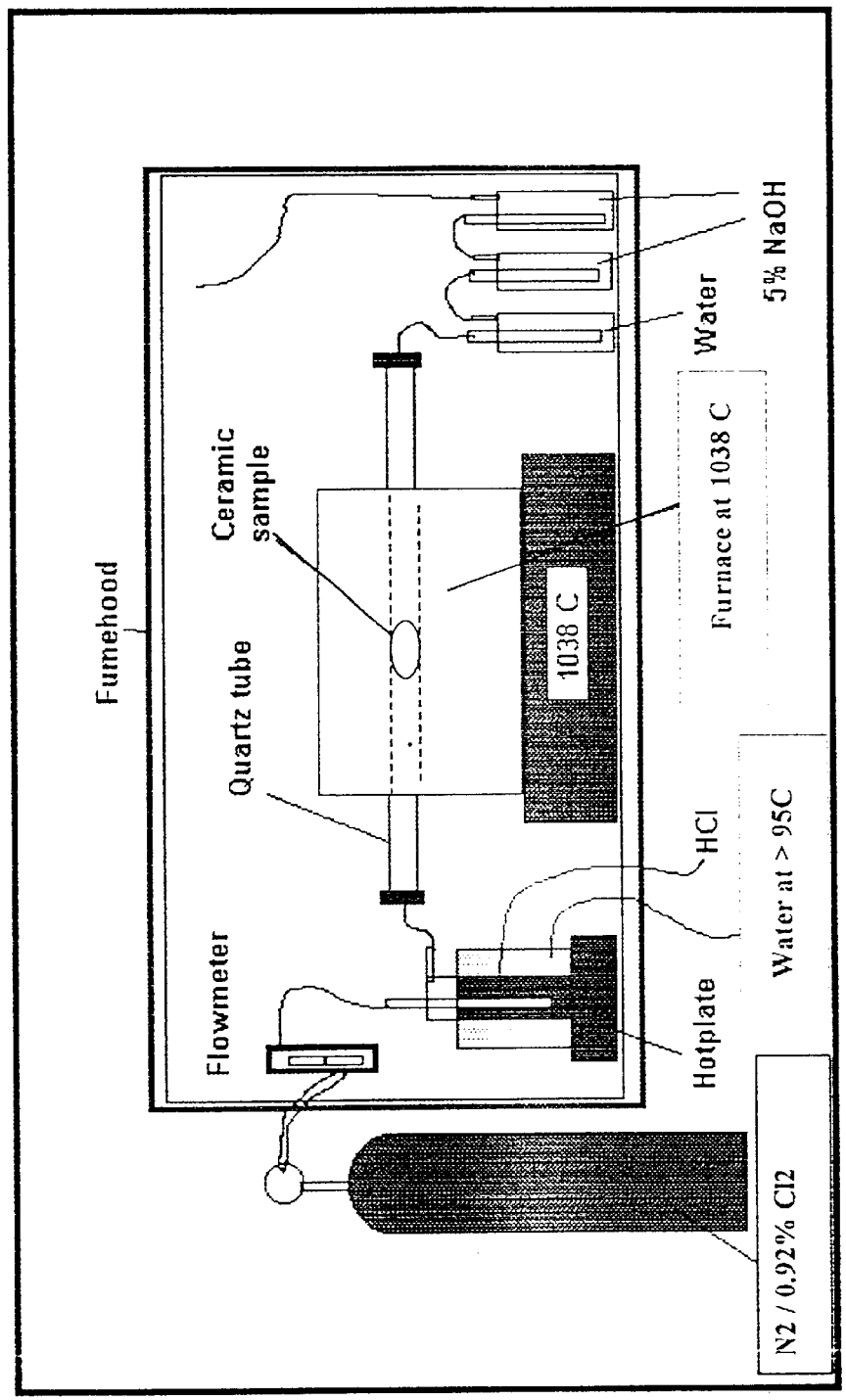
FIG. 1 is a diagram of the test set-up to evaluate the extent of reaction between ceramic samples and halogens.

For the laboratory tests, the test-bed illustrated in FIG. 1 was constructed a gas flow having a similar composition was created by bubbling a mixture of 0.92% $Cl_2$ gas (balance is $N_2$) from a pressurized tank, 1, through a jacketed container, 2, containing a 37% aqueous HCl solution on a hotplate, 3, and then directly into the test furnace, 4. The aqueous HCl solution is heated to very near the boiling point, as measured by a thermometer in the water bath surrounding the HCl bubbler reading 95° C. The $Cl_2$ flows through the test-bed at a rate of 0.23 cc/min. The HCl and $H_2O$ vapors from the heated liquid are entrained with the $N_2/Cl_2$ gas flowing through the liquid and this mixture, regulated at a flow-rate of 25 cc per minute, is forced through a quartz tube, 5, containing the sample under test, 6, maintained at 1038° C. in a furnace. Other than the provision for entry and exit ports in the respective ends, the quartz tube is completely sealed so as to ensure that the gas mixture entering passes through the sample on its way to the exit. The gases leaving the quartz tube are passed through a first bubbler tube, 7, containing water and then two further bubbler tubes, 8, containing 5% sodium hydroxide solution.

The HCl was measured for normality, and the volume was measured before and after a measured time to estimate the HCl and $H_2O$ vapor flow-rates. In a 3.5 hour run time at constant flow-rate, the volume of HCl solution dropped from 30 cc to 12 cc, and the normality was diluted from 12 N initially to 6.4 N after the 3.5 hours. Thus the flow-rate of HCl is approximately 0.05 cc/min, and the flow-rate of $H_2O$ is approximately 0.06 cc/min. in this and all subsequent tests run at the same settings and conditions.

EXAMPLE 1

In this Example we illustrate the formation of salt from a typical commercial ceramic composition when exposed to a halogen-containing atmosphere at high temperatures. The ceramic composition of Example 1 is known generally as a porcelain ceramic material, and more specifically is known as a chemical-resistant porcelain ceramic material. It is a standard ceramic material used widely in mass transfer applications including those involving exposure of the ceramic to acids such as HCl, but at temperatures much lower than that of RTO's. This material is also widely used in high temperature RTO's, but typically not in the presence of any chlorine-compounds or other halogens. The problem arises when this class of porcelain ceramic material is employed in service involving both high temperatures and halogen exposure. This Example is intended to show the evaluation process and to demonstrate the nature of the problem solved by the present invention.

The ceramic elements to be evaluated were made in the form of solid shapes which were then crushed to produce fragments and these were screened to separate 100 to 150 gm of particles in a size range larger than 6 mesh, but smaller than 4 mesh. The weight was in each case recorded to three decimal places and the sample was place in a 46 mm diameter quartz tube. The sample was positioned such that, when the tube was inserted into a kiln, the sample would be located in the center of the hot zone of the kiln. The sample was tamped down from both ends such that it occupied a length of about 12.4 cm. inside the tube and almost filled the tube in that area.

Once the tube was placed inside the kiln and the temperature of the hot zone had reached 1038° C., the gas flow described above was initiated. The gas flow was continued for a period of one hour, with the gas exiting from the tube being forced into a bubbler containing de-ionized water and thereafter through two further bubblers containing 5% sodium hydroxide. The gas flow is shut off after the one-hour period and the flexible tubing leading to the water is rinsed into the water bubbler, and this water is collected for analysis. The elemental analysis for Na, K, and Cl is done by wet chemical analysis techniques and includes the inductively coupled plasma method (ICP) and/or atomic absorption spectroscopy (AA).

The ceramic sample and the furnace temperature are left unchanged, and fresh water is placed in the exit-end bubbler, and fresh HCl is placed in the entrance-end bubbler, and the one-hour test is repeated once the hot-plate returns to temperature, after which the water is again analyzed. The whole procedure is then repeated for a third hour, and the third water solution is analyzed for Na, K, and Cl. The furnace is shut down after the third one-hour run, and when completely cool, the ceramic media is poured out of the entrance and of the quartz tube and collected and weighed. The exit end of the tube is then dipped in a graduated cylinder of deionized water, just slightly larger in diameter than the tube, and the powdery deposits inside the tube (if any) are dissolved in the water solution. This solution is then analyzed for Na, K, Cl.

In some cases, the whole procedure can be repeated on a previously tested ceramic sample, resulting in analytical data for a $4^{th}$, $5^{th}$ and $6^{th}$ hour on that sample, thus allowing the trend in salt formation rate to be determined.

A baseline test was run to show the levels of Na, K, and Cl in the water solution after an "empty tube" run of one hour, with all the exact conditions as described above, except no ceramic sample in the tube furnace. The results of this test were a total weight of Na (reported as $Na_2O$) of 0.00003 grams, and a total weight of K (reported as $K_2O$) of 0.00001 grams, and a total weight of Cl of 26.5 grams.

Figure 2:
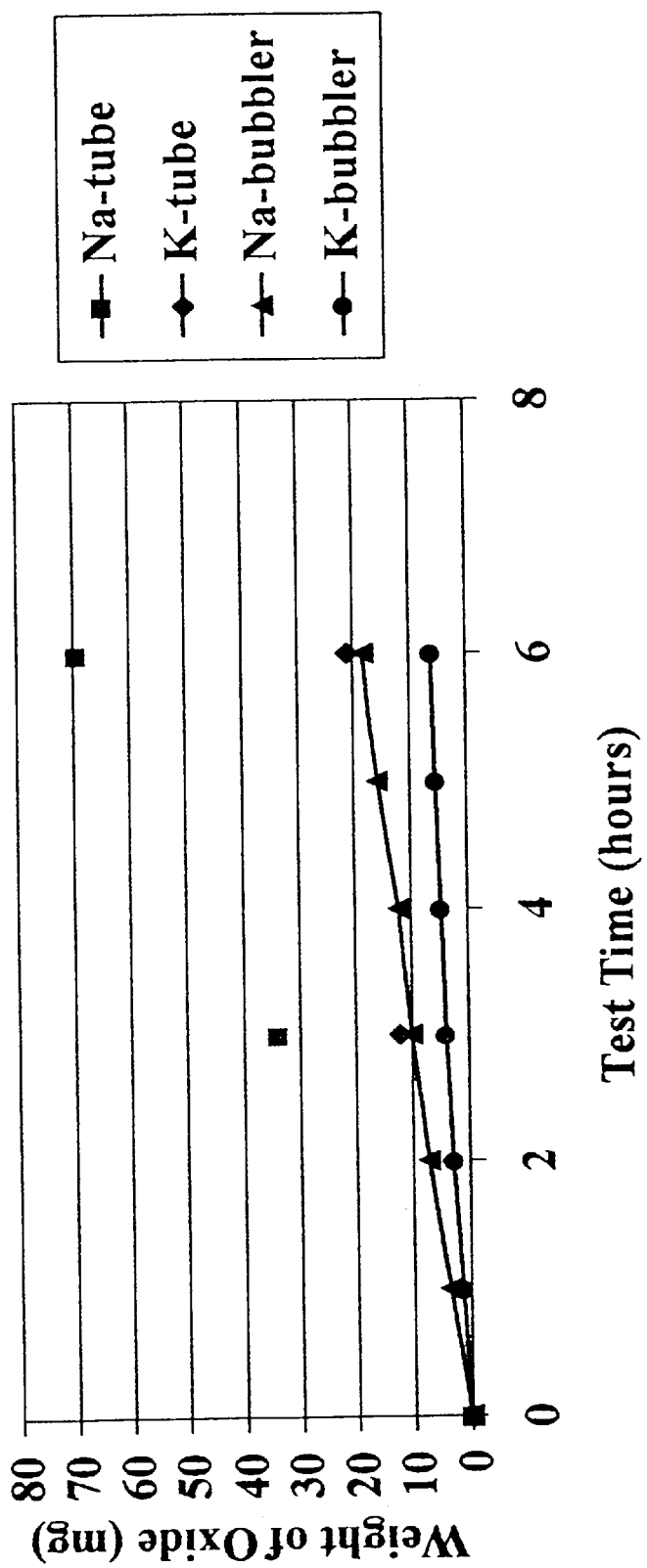
FIG. 2 is a graph showing the rate of salt formation with time in Example 1.

A test was run as described above with a ceramic sample, of the same material employed in the industrial process described above, which is comprised of a ball clay and a feldspar. The levels of Na, K, and Cl were measured in the water bubbler after each hour for 6 one-hour runs, and the levels of Na, K, and Cl were measured in the water in which the deposits inside the quartz tube had been dissolved, after the 3 hour and 6 hour point. These results are shown in FIG. 2, in which the analyses for Na and K are reported on the basis of the weights of the oxides $Na_2O$ and $K_2O$. It is a matter of mathematical calculation to convert these reported values to the weights of the elements Na; and K, or the weights of the chlorides NaCl, and KCl. From the water bubbler, the total amount of alkali measured was 0.0181 grams of $Na_2O$ and 0.0062 grams of $K_2O$. From the quartz tube, the total amount of alkali measured was 0.0694 grams of $Na_2O$, and 0.0211 grams of $K_2O$. The analysis of the alkali by x-ray diffraction confirmed that it was all chloride—NaCl, and KCl. Therefore, converting the above values to the chlorides, the amount of salts formed in the 6-hour test run were 0.0341 grams, 0.0098 grams, 0.1308 grams, and 0.0334 grams, respectively. Thus by summing these values, the total amount of NaCl plus KCl was 0.2081 grams after 6 hours of exposure. The amount of Cl measured in the water bubbler was 76.9 grams, of which nearly 76.8 grams was excess chlorine, and the difference was the amount that had reacted with the Na and K from the ceramic media to form NaCl and KCl. The total amount of Cl measured in the rinse solution from the end of the quartz tube was 0.15 grams. The incremental increases in the NaCl and KCl from both the water bubbler, and from the quartz tube, are remaining constant throughout the six one-hour periods, and by extrapolation of the data in FIG. 2, the formation of additional NaCl and KCl would be expected to continue with additional testing periods. Additionally, the test as described here resulting in the data in FIG. 2, is concluded to be a reasonably good simulation of the actual industrial process not only because of the formation of NaCl and KCl, but because the 3.8 to 1 ratio of these salts is very similar to the ratio observed in a typical industrial process that had been evaluated.

EXAMPLE 2

This Example illustrates the formulation of media elements according to the invention and the superior performance of the elements in halogen-containing atmospheres using the test-bed set up described in Example 1.

A mixture was prepared of high-alumina ball clay and fine particulate talc and the selections and proportions of the components were made such that the total $Na_2O$ plus $K_2O$ in the final body would be less than 0.2 wt %. The ball clay contains at least 36% $Al_2O_3$, which after calcination would be at least 42%, and the clay is preferably processed to a fine powder with at least 95% of the powder weight having particle sizes less than 10 micrometers and more preferably with at least 50% by weight having particle sizes less than 1 micron. This clay is of the type possessing reasonably good forming and shaping capability as indicated by a methylene blue index, ("MBI"), of the clay, as measured according to the procedure in ASTM C-837 of at least 7.5 meq./100 gm. The talc was at least 60% by weight of silica and at least 30% by weight of magnesium oxide, measured by X-ray fluorescence. Alkali metal oxides account for less than 0.1% by weight of the talc. The loss-on-ignition of the talc was less than about 9%, and the particle size of the talc was such that greater than 95% is finer than 74 microns.

The mixture was prepared by weighing 1.8 kg of the ball clay and 2.7 kg of the talc as described above and mixing these together in a high intensity mixer for one minute. Then 0.72 kg of water were added and the mixing proceeded for another 3 minutes after which the mixture was added to a lab-scale piston style de-airing extruder and the mix was forced through a 1.27 cm×1.27 cm square die. Bars were cut from the extrudate perpendicular to the direction of the extrusion at about 15 cm intervals. These bar samples were dried at 65.6° C. for more than 4 hours and then a sub-group of these was fired in saggers in a lab kiln to a max temperature of 1250° C. at a rate of about 3° C. per min and held at 1250° C. for 3 hours, After that time it was cooled at roughly 3° C./min. to ambient temperature. These bars were measured for physical and chemical properties. The water absorption (as measured by ASTM C-373) was 10.0% and the $Na_2O$ content was <0.01% and the $K_2O$ content was 0.05%, both measured by atomic adsorption spectroscopy.

A second group of the greenware bars from above was also fired in saggers in a second run in the lab kiln to a max temperature of 1250° C. reached at a heat-up rate of about 3° C./min. The temperature was held at the maximum for 3 hours, and then cooled at roughly 3° C./min. to ambient temperature levels. These bars had a water absorption as measured by ASTM C-373 of 9.9%.

These bars from the second group were then prepared and tested as described above in the evaluation procedure described in Example 1. A weighed portion of 105.28 grams of the 4×6 mesh fragments from the bars was placed in the quartz tube and the test proceeded at 1038° C. in the flowing $HCl/Cl_2/H_2O/N_2$ gas stream for three one hour segments.

Figure 3:
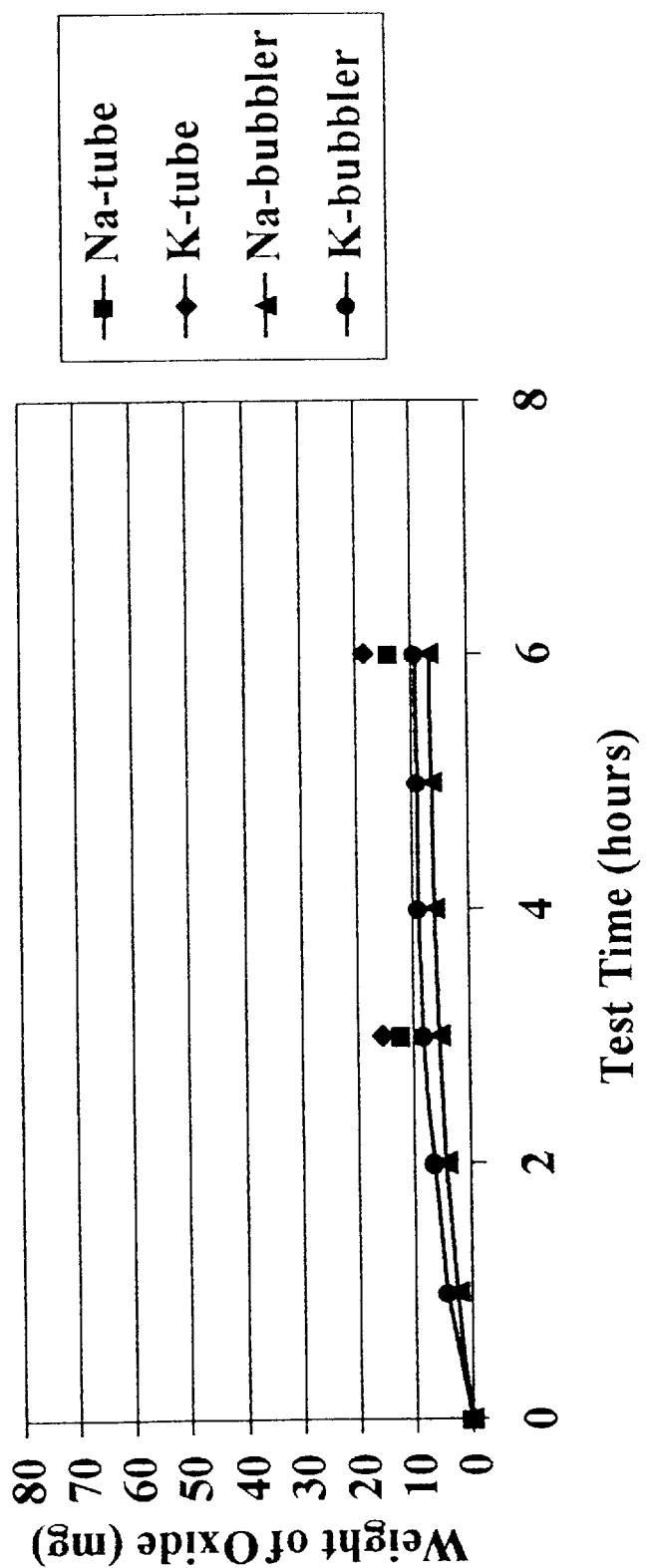
FIG. 3 is a graph showing the rate of salt formation with time in Example 2.

The water solution positioned immediately after the tube furnace was collected after each hour for analysis, and the HCl solution was replaced after each hour. After the three one-hour segments, the ceramic sample was removed from the cooled furnace and the exit-end of the quartz tube was then dipped into water to dissolve and collect any salt deposits. The ceramic was then replaced and the test was repeated for another three one-hour segments as before. The analyses of the Na and K in the water bubbler after each of the six hours, and the analyses of the Na and K in the solution collected from the tube were completed, and the results are shown in FIG. 3, in which the analyses for Na and K are reported on the basis of the weights of the oxides $Na_2O$ and $K_2O$. From the water bubbler, the total amount of alkali measured was 0.0066 grams of $Na_2O$ and 0.0092 grams of $K_2O$. From the quartz tube, the total amount of alkali measured was 0.0139 grams of $Na_2O$, and 0.0186 grams of $K_2O$. The analysis of the alkali by x-ray diffraction confirmed that it was all chloride—NaCl, and KCl. Therefore, converting the above values to the chlorides, the amount of salts formed in the 6-hour test run were 0.0124 grams, 0.0146 grams, 0.0262 grams, and 0.0294 grams, respectively. Thus by summing these values, the total amount of NaCl plus KCl was 0.0826 grams after 6 hours of exposure.

The amount of Cl measured in the water bubbler was 94.3 grams, of which at least 94.2 grams was excess chlorine, and the difference was the amount that had reacted with the Na and K from the ceramic media to form NaCl and KCl. The total amount of Cl measured in the rinse solution from the end of the quartz tube was 0.25 grams. The total of 0.0826 g of salt formation is less than half that of the 0.20812 grams generated from the commercial ceramic media element sample evaluated in the same test in Example 1. Of even more significance is the rate of formation over time, which has slowed and nearly terminated for the invention disclosed here, as shown in the graph presented in FIG. 3. Extrapolation of this data indicates little if any further salt formation should occur over subsequent testing periods.

EXAMPLE 3

This example presents another composition made from the same types of raw materials used in example 2, that also shows significant improvement in high-temp halogen resistance.

A mixture was prepared with the same ball clay as described in Example 2, but with a different, but very similar grade of talc. The talc has at least 60% by weight of silica, preferably from 60 to 66% by weight, and at least 30%, preferably from 30–33%, by weight of magnesium oxide, measured by X-ray fluorescence. Alkali metal oxides preferably account for less than 0.1% by weight of the talc. The loss-on-ignition of the talc, largely as a result of elimination of free or chemically bound water, is typically less than about 8%. The grades of talc preferred for use in the ceramics according to the invention have a particles with sizes such that at least 98% by weight are 200 mesh, (74 micrometers), or finer.

The mixture was prepared by weighing 2.7 kg (6.0 lbs) of the ball clay and 1.8 kg (4.0 lbs) of the talc, and mixing these together in a high intensity mixer for one minute. Then 1 kg (2.2 lbs) of water was added and the mixing proceeded for another 3 minutes. Then the 1.27 cm×1.27 cm×15.25 cm bar samples were prepared in the same method as in example 2. These were dried and fired just as described in example 1, but to a maximum temperature of 1230 C. These bars were measured for physical and chemical properties as in example 2, and the percent water absorption was 7.6% and the $Na_2O$ was 0.03% and the $K_2O$ was 0.08%.

Figure 4:
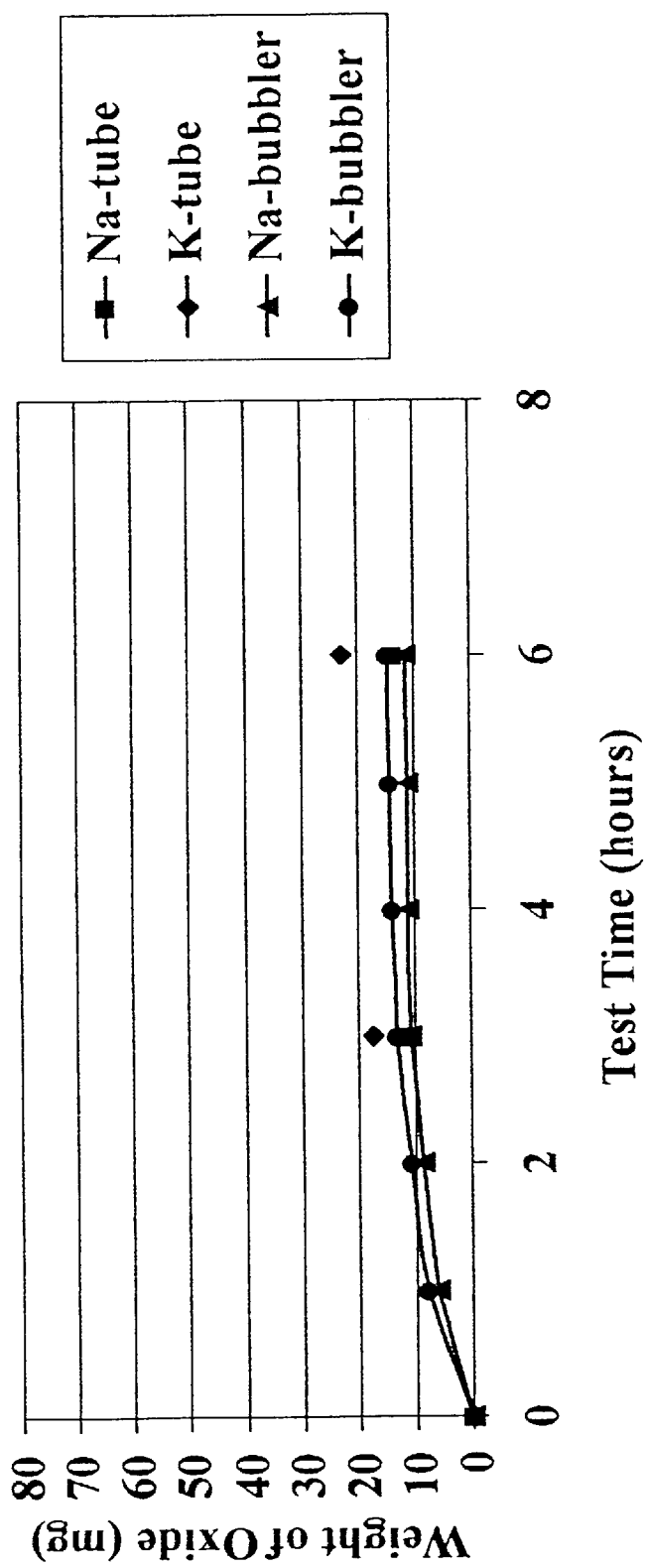
FIG. 4 is a graph showing the rate of salt formation with time in Example 3.

These bars were then prepared and tested as described above in the evaluation procedure. A weighed portion of 102.175 grams of the 4×6 mesh fragments from the bars was placed in the quartz tube and the test proceeded at 1038C in the flowing $HCl/Cl_2/H_2O/N_2$ gas stream for three one hour segments. The procedure continued just as in example 2. The analyses of the Na and K in the water bubbler after each of the six hours, and the analyses of the Na and K in the solution collected from the tube were completed, and the results are shown in FIG. 4, in which the analyses for Na and K are reported on the basis of the weights of the oxides $Na_2O$ and $K_2O$. From the water bubbler, the total amount of alkali measured was 0.0115 grams of $Na_2O$ and 0.0146 grams of $K_2O$. From the quartz tube, the total amount of alkali measured was 0.0135 grams of $Na_2O$ and 0.0227 grams of $K_2O$. The analysis of the alkali by x-ray diffraction confirmed that it was all chloride—NaCl, and KCl. Therefore, converting the above values to the chlorides, the amount of salts formed in the 6-hour test run were 0.0217 grams, 0.0231 grams, 0.0255 grams, and 0.0359 grams, respectively. Thus by summing these values, the total amount of NaCl plus KCl was 0.1062 grams after 6 hours of exposure. The amount of Cl measured in the water bubbler was 83.0 grams, of which at least 79.9 grams was excess chlorine, and the difference was the amount that had reacted with the Na and K from the ceramic media to form NaCl and KCl. The total amount of Cl measured in the rinse solution from the end of the quartz tube was 0.3 grams. The total of 0.1062 g of salt formation is about half that of the 0.20812 grams generated from the ceramic media element sample from the prior art. Of even more significance is the fact that the rate of formation over time decreases and nearly stops, as in Example 2.

EXAMPLE 4

This Example presents a similar composition to those of Examples 2 and 3, but with the addition of the dolomitic limestone. This mixture is formulated such that it has essentially the same alkali chemical composition as those used in Examples 2 and 3, but with a significant increase in strength. A mixture was prepared with the same ball clay and talc as described in Example 2, and a fine dolomitic limestone. The limestone is a mixed carbonate of magnesium and calcium in a weight ratio of these carbonates of about 1.6. The iron oxide content of the limestone is less than 1% by weight, and that of the alkali metal oxides is less than 0.25% by weight. The limestone is processed prior to formation of the ceramic to a powder with particles sizes in which at least 97% by weight are 325 mesh, (44 micrometers), or smaller.

The batch was prepared with 454 grams of the ball clay, 454 grams of the dolomitic limestone, and 3632 grams of the talc. These were dry mixed together in a high intensity mixer for one minute. Then 0.73 kg of water were added and the mixing proceeded for another 3 minutes after which the mixture was added to a lab-scale piston style de-airing extruder and the mix was forced through a 1.27 cm square die. Bars were cut from the extrudate perpendicular to the direction of the extrusion at about 15 cm intervals. These bar samples were dried at 65.6° C. for more than 4 hours and then a sub-group of these was fired in saggers in a lab kiln to a max temperature of 1250° C. at a rate of about 2.5 to 3° C. per min and held at 1250° C. for 3 hours, After that time it was cooled at roughly 3° C./min. to ambient temperature. These bars were measured for physical and chemical properties. The water absorption (as measured by ASTM C-373)

was 12.6% and the Na$_2$O content was 0.01% and the K$_2$O content was 0.02%, both measured by atomic adsorption spectroscopy. The average flexural strength of the set of bars was measured in a three-point fixture on a universal mechanical test unit with load cell, with a 5.08 cm spacing between the bottom support rods, and a top support rod centered over the two bottom supporting cylinders. The bars were placed in the support fixture one at a time, and the fixture compressed the horizontal bar at a downward speed of 1.27 cm/min. The compression was continued until the ceramic bar fractured, and the maximum load was recorded. The dimensions of each test bar were measured before the test. The strength was calculated for each bar with the following formula: 4×load×.5.08 cm/3×(thickness)$^2$×width. The average of 15 bars is calculated. The average flexural strength for the composition described here in Example 4 was 50.37×10$^6$N/m$^2$ (7310 psi). This is significantly higher than the set of bars tested in the same way made from the same composition and process of Example 2, which had an average of 18.93×10$^6$ N/m$^2$ (2747 psi). It is also significantly higher than for the set of bars tested in the same way made from the same composition and process of Example 3, which had an average flexural strength of 12.12×10$^6$ N/m$^2$ (1759 psi). The higher strength resulting from the composition of Example 4 was observed despite the higher porosity in this ceramic sample, as evidenced by a higher water absorption value than for the samples from Examples 2 or 3.

EXAMPLE 5

This Example shows the comparison in strength before and after exposure to HCl and Cl$_2$ at 1038° C., for another preparation of the same material from the invention of example 2. The mixture was prepared by weighing 1.8 kg (4.0 lbs) of the ball clay and 2.7 kg (6.0 lbs) of the talc as described above and mixing these together in a high intensity mixer for one minute. Then 0.76 kg (1.7 lbs) of water was added and the mixing proceeded for another 3 minutes after which the mixture was added to a lab-scale piston style de-airing extruder and the mix was forced through a 1.3 cm×1.3 cm square die. Cubes were cut from the extrudate perpendicular to the direction of the extrusion at about 1.3 cm intervals. These cube samples were dried at 65.6° C. for more than 4 hours and then a sub-group of these was fired in saggers in a lab kiln to a max temperature of 1250° C. at a rate of about 2.5 to 3° C. per min and held at 1250° C. for 3 hours, After that time it was cooled at roughly 3° C./min. to ambient temperature. These cubes were measured for chemical analysis, and the Na$_2$O content was <0.01% and the K$_2$O content was 0.01%, both measured by atomic adsorption spectroscopy.

The cubes were then split into two equal groups, and a sample from each was subjected to a compressive strength test. The first test was done as-is, and the test on the second lot was done after this sub-group was subjected to the high temperature HCl/Cl$_2$ tube furnace test, as described in Example 1. The compressive strength was done on individual cubes between two flat steel plates, with a loading rate of 1.27 cm per minute, and the maximum load was recorded at the point of fracture of each set An average for 10 cubes per set was calculated. The average for the first set was 1698 lbs, which calculates to 75.97×10$^6$ N/m$^2$ (11,026 psi) over the 0.994 cm$^2$ (0.154 inches$^2$) cross sectional area.

A 6-hour HCl/Cl$_2$ test was done as in Example 1, with the 37% HCl solution being changed after each one-hour increment of flowing gases through the tube at 1038° C. The initial weight of the ceramic cubes was approximately 22 grams, and these were centered in the hot zone of the tube furnace for the whole 6 hour run. The tube deposits and the water bubbler solution were collected at the end of the 6 hour run. The analyses of the Na and K in the water bubbler after the six hours, and the analyses of the Na and K in the solution collected from the tube were completed. The total amount of NaCl plus KCl form the bubblers and the tube, calculated from the analyses for Na and K, was 0.0256 grams after 6 hours of exposure. The amount of Cl measured in the water bubbler was 69.3 grams, of which the vast majority is excess chlorine, and the difference was the amount that had reacted with the Na and K from the ceramic media to form NaCl and KCl. The total amount of Cl measured in the rinse solution from the end of the quartz tube was 0.09 grams. These samples, having had a significant amount of the initial alkali content removed, were tested to determine if there was any change in strength from the tube-furnace test exposure. The compressive strength was measured exactly as above for the first set, and the result on this post-exposure set was an average of 2015 lbs, or 85.17 ×10$^6$ N/m$^2$ (12,362 psi), indicating there was no loss of strength from the 6 hour exposure to the harsh test environment.

We claim:

1. Ceramic media comprising less than 0.25% by weight of alkali metal, measured as the oxide, formed from a fired mixture comprises 10–98% by weight of a clay having an alumina content of at least 36% by weight; from 2 to 90% by weight of a talc containing at least 95% by weight of magnesium silicate as, determined by X-ray diffraction analysis; and from 0–10% by weight of a dolomitic limestone containing 60–90% by weight of calcium carbonate and 10–40% by weight of magnesium carbonate and 10% to 40% by weight of magnesium carbonate and less than 10% of non-carbonate impurities, the ceramic media having a water absorption of 7.6%–12.6%.

2. Ceramic media according to claim 1 in which the clay component is a fine powder with at least 95% of the powder weight having particle sizes less than 10 micrometers.

3. Ceramic media according to claim 1 in which the clay component is a ball clay.

4. Ceramic media according to claim 1 in which the clay component is a fine powder with a methylene blue index, as measured according to the procedure in ASTM C-837, of at least 7.5 meq./100 gm.

5. Ceramic media according to claim 1 in which the talc comprises at least 60% by weight of silica and at least 30% by weight of magnesium oxide measured by x-ray fluorescence.

6. Ceramic media according to claim 1 in which the talc has a loss-on-ignition of less than about 9%.

7. Ceramic media according to claim 1 in which the talc has particles with sizes such that at least 95% by weight are 200 mesh or finer.

8. Ceramic media according to claim 1 in which the dolomitic limestone has an iron oxide content of less than 1% by weight and an alkali metal oxide content of less than 0.5% by weight.

9. Ceramic media according to claim 1 in which the dolomitic limestone has a particle size in which at least 95% by weight are 325 mesh or smaller.

10. Ceramic media comprising less than 0.25% by weight of alkali metal, measured as the oxide, formed from a fired mixture comprising 10–98% by weight of a clay having an alumina content of at least 36% by weight; from 2 to 90% by weight of a talc containing at least 95% by weight of magnesium silicate as determined by X-ray diffraction analysis; and from 0–10% by weight of a dolomitic limestone containing 60–90% by weight of calcium carbonate and 10–40% by weight of magnesium carbonate and 10% to 40% by weight of magnesium carbonate and less than 10% of non-carbonate impurities, the ceramic media having a water, absorption of 7.6%–12.6%, in which the alkali metal includes sodium at a concentration of up to 0.03%, measured as the oxide, as measured by atomic absorption spectroscopy.

11. Ceramic media comprising less than 0.25% by weight of alkali metal, measured as the oxide, formed from a fired mixture comprising 10–98% by weight of a clay having an alumina content of at least 36% by weight; from 2 to 90% by weight of a talc containing at least 95% by weight of magnesium silicate as determined by X-ray diffraction analysis; and from 0–10% by weight of a dolomitic limestone containing 60–90% by weight of calcium carbonate and 10–40% by weight of magnesium carbonate and 10% to 40% by weight of magnesium carbonate and less than 10% of non-carbonate impurities, the ceramic media having a water absorption of 76%–12.6%, in which the alkali metal includes potassium at a concentration of 0.05%, measured as the oxide, as measured by atomic absorption spectroscopy.

* * * * *